Sept. 18, 1945.   T. F. BLUDWORTH   2,385,254
INTERVAL METER AND INDICATOR THEREFOR
Filed Aug. 21, 1941   3 Sheets-Sheet 2
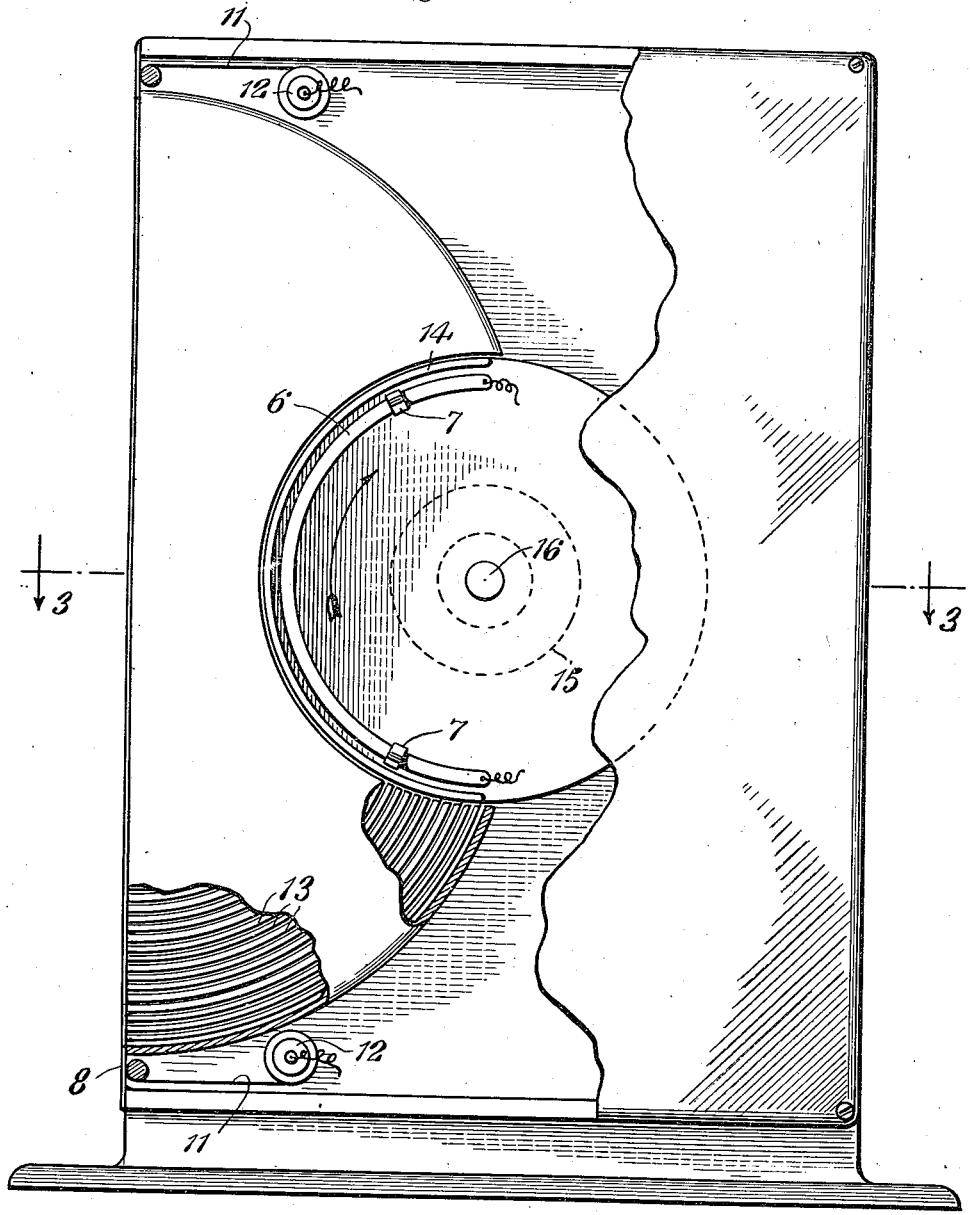
INVENTOR
Timothy Frank Bludworth
BY
Hastings W. Baker
ATTORNEY Sept. 18, 1945.  T. F. BLUDWORTH  2,385,254
INTERVAL METER AND INDICATOR THEREFOR
Filed Aug. 21, 1941  3 Sheets-Sheet 3
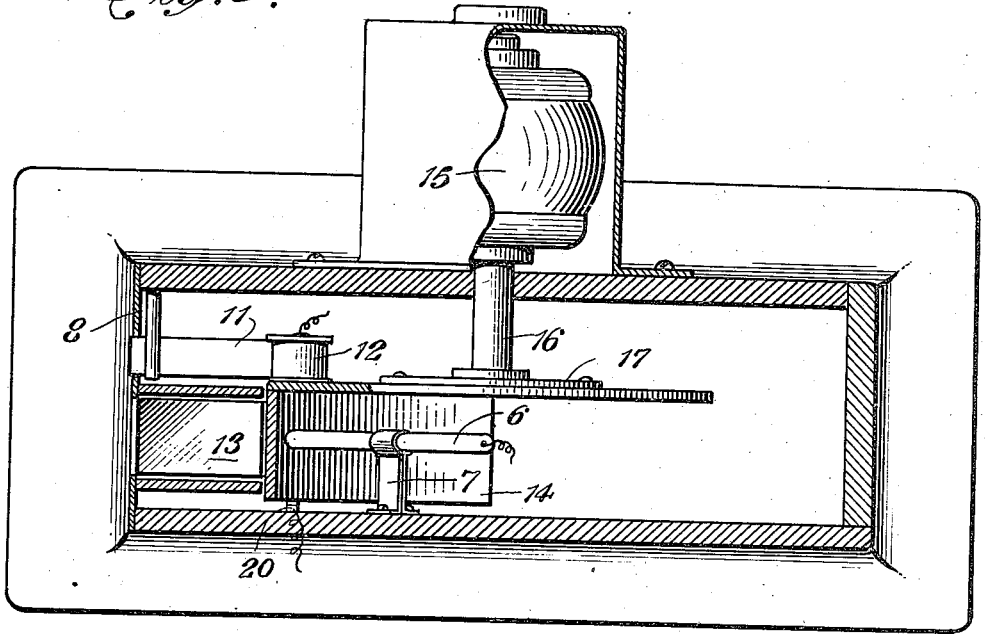
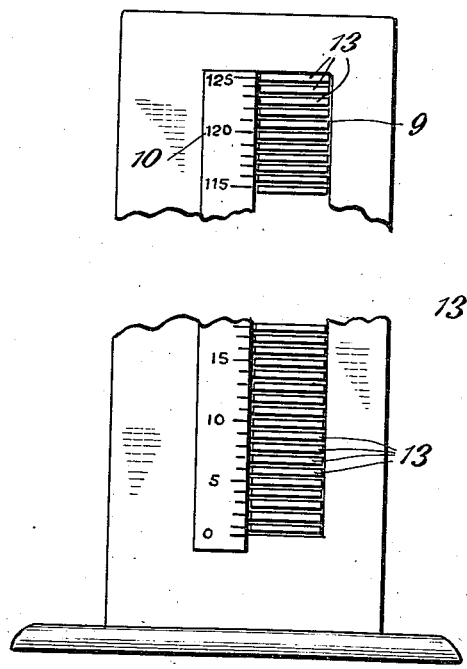
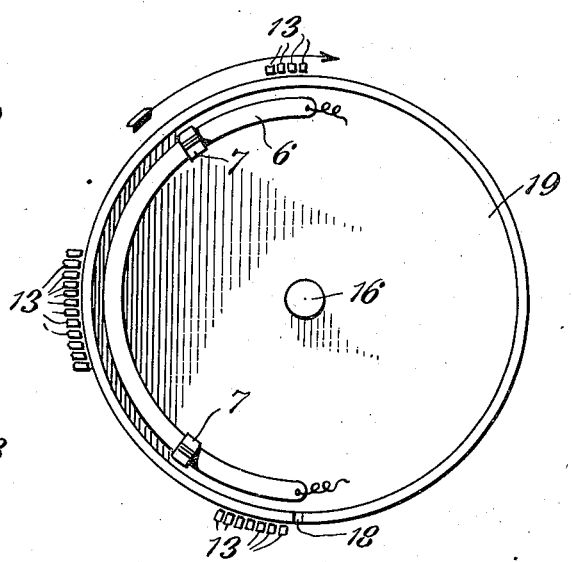
INVENTOR
Timothy Frank Bludworth
BY
Hastings W. Baker
ATTORNEY Patented Sept. 18, 1945

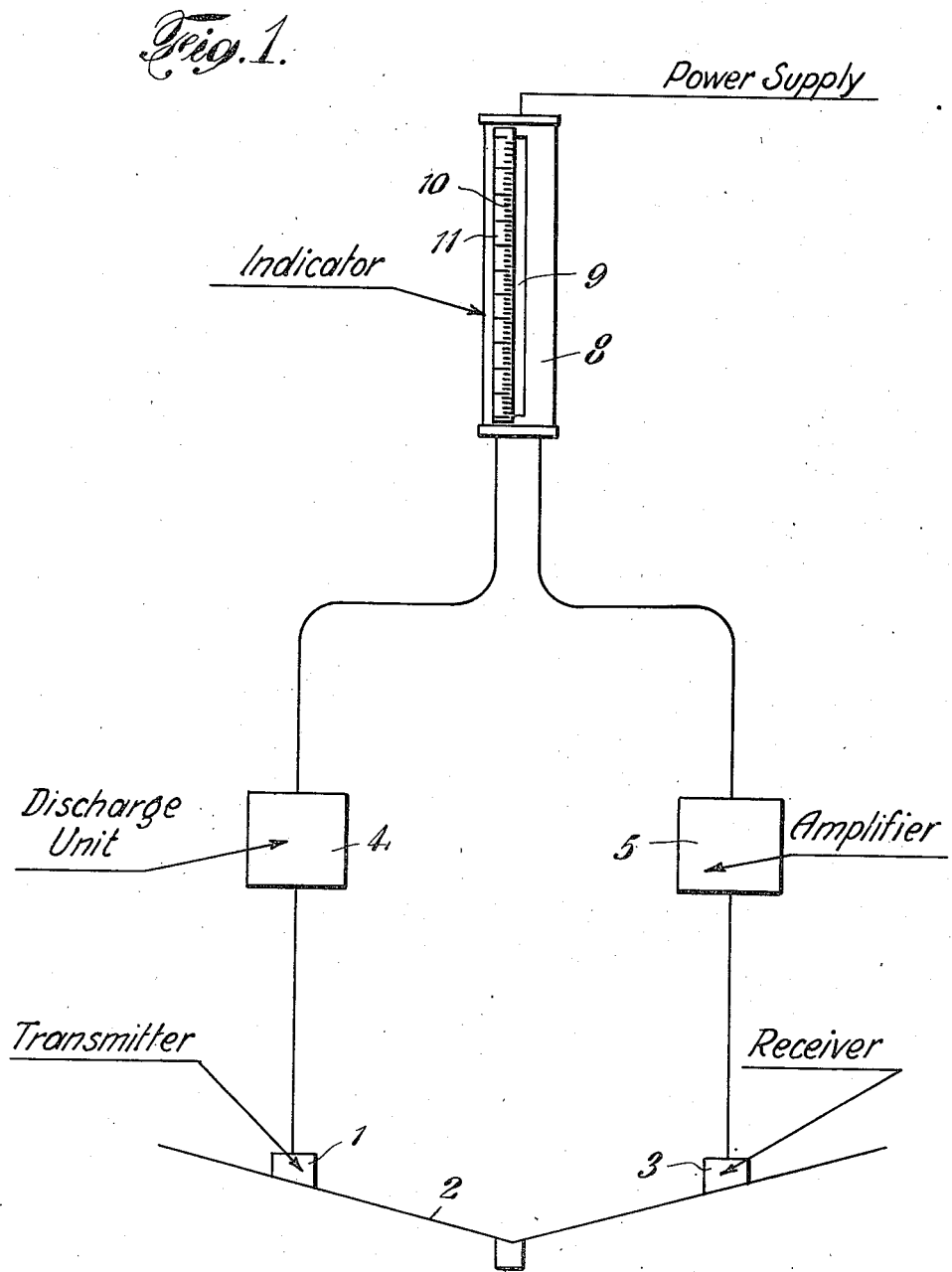

2,385,254

UNITED STATES PATENT OFFICE 2,385,254

INTERVAL METER AND INDICATOR THEREFOR

Timothy Frank Bludworth, Summit, N. J., assignor to National-Simplex-Bludworth, Inc., a corporation of New York Application August 21, 1941, Serial No. 407,779

3 Claims. (Cl. 116—129)

This invention relates to an indicator adapted to indicate the time interval between the happening of two successive events. It may be utilized for many purposes such as a torsionmeter for a shaft, or as a distance or depth measuring device, and for other uses.

For instance, in measuring distance by an echo method, the time interval between the sending of a signal and the receipt of its echo will depend upon the total distance traveled by the sound, and the velocity of sound through the transmitting medium.

In the form of the invention, as shown by way of illustration herein, I have shown an indicator which would indicate the total distance by any one of four means, as follows:

(1) A rising column of light of zero length at the moment the signal is sent and increasing in length until the echo is received, at which time the light goes out.

(2) A column of light which is flashed at the moment the echo is received.

(3) A light beam which appears to travel upwardly from zero to a maximum starting at the moment that the signal is sent out and ending when the echo is received, or (4) A beam of light which momentarily appears at the moment the echo is received.

In any of these cases, if a scale is provided which properly interrelates the functions of time and velocity, the distance to an objective such as the ocean bottom or any other object may be readily read on the scale by reading on the scale the extreme upper end of the light at the moment it is extinguished.

The invention may be better understood in connection with the attached drawings in which Figure 1 is a front elevational view of the indicator and the operating means therefor.

Figure 2 is a side elevational view partly in cross section of the indicator.

Figure 3 is a plan view partly in cross section on the line 3—3 of Figure 2 looking in the direction of the arrows.

Figure 4 is a detailed front elevational view, partly fragmentary, of the indicator and, Figure 5 shows a modified type of shutter and the light means therefor.

In the embodiment of the invention shown by way of illustration herein a transmitter 1 and receiver 3 are mounted in the hull of a ship 2. The transmitter 1 is in circuit with a discharge unit 4. When the shutter, to be hereinafter described, is passing through a zero position, the sending circuit is completed and a signal is sent out from the transmitter 1, which travels to a reflecting object such as the bottom of the sea, submarine, or other object from whence it is reflected back as an echo to the receiver 3. The receiver 3 is in circuit with an amplifier 5 leading to a light such as a neon tube 6 supported by brackets 7. This receiving circuit may be of the type so that the light is illuminated during the small interval of time to be measured between the sending of the signal and the receipt of its echo, or it may be of the type such as the light is momentarily illuminated at the moment of the receipt of the echo. Both of such circuits are so well known in the art that further description is not necessary. Such arrangements are shown in the Dorsey Patent 1,667,540.

The indicator 8 consists of a plate having a rectilinear slot 9 therein, and adjacent the slot are indicia 10 which may be calibrated to represent suitable units of distance or whatever is to be measured. Preferably the indicia are on a strip 11 of Lucite which may be illuminated by a lamp 12 so that the indicia will be readily readable at night. The light 12 would be continuously illuminated until it was manually cut off. Projecting into the window 9 are the outer ends of a plurality of light conducting members 13, such as Lucite. These Lucite bars 13 form a stack extending for the height of the window 9, and are bent so that their rear ends form a substantial semicircle closely adjacent to the outer periphery of the constantly rotating shutter 14. The shutter 14 is rotated by constant speed motor 15 which rotates the shaft 16 and bracket 17 connected to the said shutter. Preferably, the shutter extends for approximately 180 degrees, as is shown in Figure 2.

The circuit connected to the receiver 3 extends to the neon tube 6.

Assuming that the light 6 is in a circuit which is illuminated during the interval of time between the transmission of the signal and the receipt of the echo, and assuming that the parts are in a position shown in Figure 2 at the instant the signal is sent out, and if the constantly rotating shutter 14 rotates in the direction of the arrow as shown in said Figure 2, it is obvious that the shutter would uncover the bottom strip of Lucite substantially simultaneously with the emission of the signal. As the shutter continues to rotate in the direction of the arrow, it would successively uncover the rear ends of the bars of Lucite starting from the bottom and going upwardly. As each Lucite bar was uncovered, the light from the lamp 6 would travel through the length thereof and would shine in the window 9. This operation would continue until the echo was received, which serves as a means of extinguishing the light. The observer could therefore read the maximum height in the window of the Lucite bars which were illuminated at the moment that the light was extinguished, and the indicia 10 would indicate to the observer the depth of the water or the distance of the object which sent back the echo. Obviously, the calibration of the scale would be different if the signal were being sent through water than what it would be if it were sent through some other medium such as air.

In the structure shown in Figure 2, if the light were in a circuit so that the light would be illuminated only momentarily at the instant of the receipt of the echo, the observer would see on the indicator a momentary column of light representing the distance to be measured.

The modification shown in Figure 5 differs from that shown in Figure 2 in that the shutter, instead of extending for 180°, extends for the entire circumference thereof or 360° minus a small opening constituting the slot 18. If the slot 18 were in its zero position or just ready to reach the lowest Lucite bar, at the instant the signal was transmitted, the light from the lamp 6 would shine through the slot in the shutter 19 and successively illuminate momentarily the Lucite bars, provided the lamp was illuminated during the interval of time to be measured. In this case, the observer would notice the Lucite bars successively illuminated starting at the bottom and progressing toward the top until the light went out at the moment of the receipt of the echo.

If, on the other hand, the light were illuminated only momentarily, at the moment of the receipt of the echo, the observer would notice a momentary flash of light at the end of the particular Lucite bar adjacent the then position of the slot 18, at the moment the light flashed, which is at the moment of the receipt of the echo.

In order to actuate the transmitter 1 at the moment the shutter uncovers the lowermost Lucite bar, a switch 20, as shown in Fig. 3, is closed at the instant the shutter is at its zero point in its cycle of rotation, that is, when it is in the position shown in Figure 2.

In using the term Lucite, I, of course, do not mean to limit myself to that particular material, as obviously any material which will transmit light without dispersing it may be employed. In the claims I shall therefore refer to these bars as light transmitting bars, and I intend this term to include Lucite bars or other bars which would perform substantially the same function.

Obviously, many changes may be made in the specific structure shown by way of illustration herein, and I desire to claim the same broadly, except as I may limit myself in the appended claims.

I claim:

1. An indicator including a stack of light transmitting bars having the outer ends terminating in a vertical plane and their inner ends forming an arc of a circle, means to uncover successively the inner ends of said bars commencing with the lowermost one and progressing toward the uppermost ones, a light and means to cause the light to illuminate at least the uppermost uncovered bar in selected positions of the first named means.

2. An indicator including a stack of light transmitting bars having the outer ends terminating in a plane and their inner ends forming an arc of a circle, an arcuate shutter rotatable behind the inner ends of said bars and adapted to successively uncover the inner ends of said bars, a light and means to cause the light to illuminate at least the uppermost uncovered bar in selected positions of the shutter.

3. An indicator including a stack of light transmitting bars having the outer ends terminating in a plane and their inner ends forming an arc of a circle, an arcuate shutter rotatable behind the inner ends of said bars and adapted to successively uncover the inner ends of said bars, a light and means to cause the light to illuminate the uncovered bars in selected positions of the shutter.

TIMOTHY FRANK BLUDWORTH.